US011866520B2

(12) United States Patent
Taylor et al.

(10) Patent No.: US 11,866,520 B2
(45) Date of Patent: Jan. 9, 2024

(54) FUNCTIONALISED COMPOUNDS (71) Applicant: PHOSPHONICS LIMITED, Compton (GB)

(72) Inventors: Nicholas P. Taylor, Compton (GB); Laura C. Forfar, Compton (GB); Paul M. Murray, Compton (GB); Christopher North, Compton (GB); Alexander Watson, Compton (GB)

(73) Assignee: Phosphonics Limited, Compton (GB)

( * ) Notice: Subject to any disclaimer, the term of this patent is extended or adjusted under 35 U.S.C. 154(b) by 388 days.

(21) Appl. No.: 16/766,219

(22) PCT Filed: Nov. 22, 2018

(86) PCT No.: PCT/EP2018/082265
§ 371 (c)(1),
(2) Date: May 21, 2020

(87) PCT Pub. No.: WO2019/101883
PCT Pub. Date: May 31, 2019

(65) Prior Publication Data
US 2021/0147578 A1 May 20, 2021

(30) Foreign Application Priority Data
Nov. 22, 2017 (GB) .................................. 1719418

(51) Int. Cl.
C08B 3/10 (2006.01)
B01J 20/24 (2006.01)
B01J 20/28 (2006.01)
C01G 7/00 (2006.01)
C01G 55/00 (2006.01)
C02F 1/28 (2023.01)
C08B 31/04 (2006.01)
C02F 101/20 (2006.01)
C02F 103/10 (2006.01)

(52) U.S. Cl.
CPC ............... C08B 3/10 (2013.01); B01J 20/24 (2013.01); B01J 20/28019 (2013.01); B01J 20/28023 (2013.01); B01J 20/28033 (2013.01); C01G 7/00 (2013.01); C01G 55/002 (2013.01); C02F 1/286 (2013.01); C08B 31/04 (2013.01); B01J 2220/4825 (2013.01); C02F 2101/20 (2013.01); C02F 2103/10 (2013.01)

(58) Field of Classification Search
CPC .. C08B 3/10; C08B 31/04; B01J 20/24; B01J 20/28019; B01J 20/28023; B01J 20/28033; B01J 2220/4825; C01G 7/00; C01G 55/002; C02F 1/286; C02F 2101/20; C02F 2103/10
USPC ......................................................... 423/22
See application file for complete search history.

(56) References Cited

U.S. PATENT DOCUMENTS
2010/0093662 A1 4/2010 Defaye et al.

FOREIGN PATENT DOCUMENTS
GB 2570550 B 10/2022
WO 201112806 A1 10/2011

OTHER PUBLICATIONS

Galaffu, Nicola et al., "Highly functionalized sulfur-based silica scavengers for the efficient removal of palladium species from active pharmaceutical ingredients", Organic Process Research and Development, Jan. 1, 2007 (Jan. 1, 2007 ), pp. 406-413, vol. 11, No. 3, Cambridge, GB.
Yang, Rui et al., "Thiol-modified cellulose nanofibrous composite membranes for chromium (VI) and lead (II) adsorption", Polymer, Elsevier Science Publishers B.V, Feb. 1, 2014 (Feb. 1, 2014 ), pp. 1167-1176, vol. 55, No. 5, GB.
Lutzke, Alec et al., "Nitric oxide-releasing S-nitrosated derivatives of chitin and chitosan for biomedical applications", Journal of Materials Chemistry B, Jan. 1, 2014 (Jan. 1, 2014 ), pp. 7449-7458, vol. 2, No. 42, GB.
International Preliminary Report on Patentability dated May 26, 2020 for International Application No. PCT/EP2018/082265.
International Search Report and Written Opinion dated Mar. 22, 2019 for International Application No. PCT/EP2018/082265.
UK Search Report Dated Apr. 28, 2018 for Application No. GB1719418.4.
Edson C. Silva Filho et al., "Immobilization of ethylene sulfide in aminated cellulose for removal of the divalent cations", Carbohydrate Polymers, Oct. 17, 2012, vol. 92, No. 2, pp. 1203-1210.
James Coombs Obrien et al., "Continuous Production of Cellulose Microbeads via Membrane Emulsification", ACS Sustainable Chem. Eng., Jul. 3, 2017, vol. 5 (7), pp. 5931-5939.
Mitsuru Abe et al., "Fast and facile dissolution of cellulose with tetrabutylphosphonium hydroxide containing 40 wt% water", Chem. Commun., 2012, vol. 48 (12), pp. 1808-1810.
Nobuyoshi Aoki et al., "6-Deoxy-6-mercaptocellulose and its S-substituted derivatives as sorbents for metal ions", Reactive Functional Polymers, Nov. 24, 1999, vol. 42, pp. 223-233.
UK Search Report for Application No. GB1819051.2 dated May 22, 2019.
Marchant, "Modified Cellulose Absorbent for Removal of Mercury form Aqueous Solutions", Environmental Science and Technology, vol. 8, No. 12, pp. 993-996 (1974).

(Continued)

Primary Examiner — Edward M Johnson
(74) Attorney, Agent, or Firm — Cook Alex Ltd.

(57) ABSTRACT

A substantially insoluble compound having a polysaccharide backbone which is derivatised at one or more of its hydroxyl groups with a ligand (L) bound to the sugar moiety by a sulphur atom which may be tailored according to a wide range of applications. The compound is useful as a catalyst and in removal of contaminants from a feed containing particularly metal ions.

21 Claims, 1 Drawing Sheet (56) References Cited

OTHER PUBLICATIONS

Takagai, et al., "Synthesis and evaluation of different thio-modified cellulose resins for the removal of mercury (II) ion from highly acidic aqueous solutions", Journal of Colloid and Interface Science, pp. 593-597 (2011).

FUNCTIONALISED COMPOUNDS

CROSS-REFERENCE TO RELATED APPLICATIONS

This is a U.S. National Stage of International PCT Application No. PCT/EP2018/082265, filed Nov. 22, 2018 which claims the benefit of and priority to Great Britain Application No. 1719418.4, filed Nov. 22, 2017, the disclosures of which are hereby incorporated by reference in their entireties.

This invention relates to the substantially insoluble polysaccharide compounds, cellulose and starch having a thio linked functional ligand and particularly to thiol-functionalised cellulosic compounds. The invention also relates to the use of such compounds in metal scavenging and especially in the recovery of precious or heavy metals. The compounds of the invention may also be used in solid phase purification or extraction materials, ion exchange materials, catalysts, catalyst immobilisation supports, immobilisation materials for bio-molecules, hydrophilicity modifiers, antistatic agents, solid phase synthesis materials and chromatography materials.

The use of functionalised materials, particularly solids, is known for many different applications such as solution phase synthesis, solid phase synthesis, solid phase extraction, catalysis, catalyst supports, product purification and the immobilisation of bio-molecules. Functionalised solids are beneficial in many fields due to a range of factors including ease of manipulation, simple separation from the rest of the medium for example by filtration and regeneration and reuse. Functionalised materials suitably have excellent physical and chemical stability over a wide range of operating conditions and other desirable characteristics include compatibility with a wide range of solvents, fast kinetics and functional groups with high intrinsic activity for the desired application.

Functionalised materials are in widespread use in the selective removal of cations and anions from liquid, typically aqueous, environments. For environmental reasons including in some cases stricter environmental regulations, and economic reasons, removal and recovery of toxic and hazardous chemicals, for example cations and anions, from sources including contaminated products, active pharmaceutical ingredients (API), solvents, organic based waste streams, potable water and aqueous based wastes and from contaminated waters is desirable. For example the electronics industry has a particular need for ultra pure water with very low levels of both cations and anions. Other industries such as the nuclear industry and the electroplating industry generate substantial quantities of water-based effluent that are heavily contaminated with undesirable metal ions. In the pharmaceutical industry metal catalysts are increasing being used in the manufacture of APIs or their intermediates. Given the toxicity of these metals very low residual levels have to be achieved in the API. In the preparation of compound libraries for biological evaluation simple and quick processes are required to purify reaction mixtures in order to screen thousands of compounds to identify leads for optimisation and development programmes.

Anions such as arsenates, chromates, permanganates, borates and perchlorates pose many significant problems to the environment and health. For example arsenates, chromates and permanganates are highly toxic and their concentrations in water or other medium has to be carefully controlled. A need exists for materials with very high affinity for such anions in order to reduce their levels below acceptable limits.

Precious metals such as platinum, palladium, nickel and rhodium and their complexes are extensively used to mediate a wide range of chemical reactions. The metals are typically very expensive and may be highly toxic metals. In the production of APIs, the metal may often form complexes and residual metal contents in the range of 600-1000 ppm are not uncommon. Target levels for palladium, platinum, rhodium and nickel in an API are typically less than 5 ppm. Various methods have been tried to reduce the residual metal content.

Accordingly, a need remains to provide functionalised materials that have a high affinity for cations and anions and particularly for precious metals and can readily remove them from process streams across a wide spectrum of solvents from organic to aqueous and suitably across a wide pH range. Furthermore given the structural diversity of process streams it is necessary to have a range of functionalised materials with different structures and high affinity in order to provide an effective solution across the whole range.

Loss of metals through lack of recovery and recycling also increases the demand for raw materials. The cost of mining metals and the scarcity of sources, particularly for precious metals, provides impetus to improve further methods and materials for recovering metals from products and aqueous and non-aqueous liquid sources.

Both inorganic and organic polymer systems have been employed as functionalised materials for example for use as catalysts and in removing cations and anions from a contaminated material. Examples of inorganic polymers include silica, aluminium oxide and titanium oxide and active functional groups or metals can be attached by a variety of means to such polymer systems. However a number of problems may be encountered where the functional groups are only physically adsorbed, for example low functional group loading, limitations in the range of suitable solvents that may be used and removal of the functional groups on use or on standing. Including the functional group in the polymer framework as a covalently linked group may provide a more robust material and may also permit higher functional group loadings. However, sourcing readily available starting materials and precursors for preparing such starting materials may be difficult and costly and synthetic methodologies for the preparation of suitable starting materials may be limited.

Organic polymers for example polystyrene derivates, polysaccharides, cyclodextrins and cellulose have been used in a wide range of applications including in metal recovery and in cation exchange. Substituted polystyrene derivatives are known for use in solution phase organic synthesis to aid rapid purification and workup and for use in solid phase synthesis. The chemical and physical properties of a variety of such polystyrene based systems are described in the Bio-Rad Life Science Research Products catalogue 1998/99, pages 56-64. Whilst the organic polymeric backbone of organic polymers may offer environmental benefits, the physical and chemical properties of these polystyrene resins have proved disadvantageous in certain circumstances due to, for example, poor chemical stability and thermal stability as well as poor wetting in aqueous streams. Generally, these polystyrene resins cannot be used for any length of time above 80° C., thus limiting their general applicability.

Functionalised polystyrenes may also exhibit swelling and shrinking in organic solvents and may contain undesirable impurities which may lead to unwanted side products which may for example be coloured.

Whilst functionalised silicas afford a range of benefits, performance may be dependent on pH and thereby limit their field of use.

Polysaccharides and cyclodextrins are known to bind with certain metals and the use of these materials to recover metals is known.

Cellulosic materials such as wood and regenerated cellulose have been employed to remove trace heavy metals from waste waters as described in JP 48006993. Cellulose modified with cysteine to form nanofibrous composite membranes for absorbing metals have been reported by B. Chu in Polymer, 2014, pages 1167 to 1176.

A need remains for a material which may be functionalised with a wide range of different functional groups to allow the material to be tailored to a range of fields of use, particularly in the recovery of metals from metal-containing solutions or streams and have an adequate loading of the functionalised groups for effective performance. In addition, preparation from readily available reagents in a reliable and cost-effective manner at a commercial scale is desirable. A biorenewable or biodegradable material would have further advantages for the sustainability of the process.

The inventors have now devised certain functionalised polysaccharide compounds which are substantially insoluble in aqueous solution and organic process streams in which they are employed and which have functional groups linked to a sugar moiety in the polysaccharide through a sulphur atom. The functionalised polysaccharide compounds provide materials which provide a desirable combination of characteristics suitable for use as functionalised materials in a range of applications including acting as scavengers for inorganic and organic compounds, solid phase purification or extraction materials, ion exchange materials, catalysts, catalyst immobilisation supports, immobilisation materials for bio-molecules, hydrophilicity modifiers, antistatic agents, solid phase synthesis materials and chromatography materials.

The invention provides in a first aspect a compound comprising a substantially insoluble polysaccharide compound selected from cellulose and starch, preferably cellulose, having a backbone comprising more than 20 sugar moieties wherein at least one of the sugar moieties is derivatised at one or more of its hydroxyl groups with a ligand (L) bound to the sugar moiety by a sulphur atom wherein the ligand L is of formula:

—S(O)$_a$(C R$^2$)$_n$X wherein:
independently in each occurrence, R$^1$ and R$^2$ are selected from hydrogen, an optionally substituted, linear or branched C$_{1-40}$-alkyl, C$_{2-40}$-alkenyl or C$_{2-40}$-alkynyl group, an aryl and a C$_{1-40}$-alkylaryl group;
a is, independently in each occurrence from 0 to 2;
n is independently an integer from 1 to 22, preferably 1 to 12, especially from 1 to 6, for example 1, 2 or 3:
X is selected from:
—CR$^1$R$^2$R$^3$,
a divalent group, preferably —[CO$_2$(CH$_2$)$_m$CO$_2$]— or —[CH$_2$(CH$_2$)$_m$CH$_2$]-linking two sugar moieties and m independently being 1 to 10, preferably 1 to 6, for example 1, 2, or 4;
—CR'R$^2$ (CR$^1$R$^2$)$_n$C(=W)R,
—CR$^1$R$^2$ (CR$^1$Z)$_i$ Q$_h$ CHR$^1$Z,
—CR'R$^2$(CR$^1$Z)$_i$ Q$_h$ [(CHR$^1$)$_n$W]$_t$R$^1$,
—(CR$^1$Z)$_i$ Q$_h$ C(=W)R$^1$
—CR$^1$R$^2$(CR$^1$Z)$_i$ Q$_h$R$^3$
—OC(=W)R;

wherein
R is independently selected from H, R$^1$, —OR$^1$, —NR$^1$R$^2$, —NHNR$^1$R$^2$ and —SR'; R$^3$ is an optionally substituted, linear or branched C$_{1-40}$-alkyl, C$_{2-40}$-alkenyl or C$_{2-40}$-alkynyl group, an aryl and a C$_{1-40}$-alkylaryl group;
Q is independently selected from —C(=W$^1$)W$^2$— and —W$^2$C(=W$^1$)—; W, W$^1$ and W$^2$ are independently selected from oxygen, sulfur, —N(R$^1$)— and —N(NR$^1$R$^2$);
Z is independently selected from —OR$^1$, —NR$^1$R$^2$ and —SW;
h is independently 0 or 1;
i is independently from 0 to 6;
t is independently an integer from 1 to 20, preferably 1 to 3.
—[C(=W)]$_n$(W(C R$^1$R$^2$)$_m$)$_n$Z, and preferably in this case R$^1$ and R$^2$ are H and Z is OH or NH$_2$; and
—S(O)$_a$—Y
wherein Y is a monovalent terminal group, preferably selected from H and the options for X, excluding —S(O)$_a$—Y.

Advantageously, compounds according to the invention are suitable for use as scavengers for inorganic and organic compounds, solid phase purification or extraction materials, ion exchange materials, catalysts, catalyst immobilisation supports, immobilisation materials for bio-molecules, hydrophilicity modifiers, antistatic agents, solid phase synthesis materials and chromatography materials. The functional group or groups can be tuned to have either a high or low level of loading according to the requirements of the user and the compounds have good thermal stability, fixed and rigid structures, good stability to a wide range of chemical conditions, high resistance to ageing and are suitably biorenewable.

The term "substantially insoluble" refers to solubility of the derivatised polysaccharide in aqueous solution. Cyclodextrins and small saccharide molecules such as monosaccharides and oligo-saccharides having 10 or fewer saccharide groups which exhibit solubility in water to any material degree are not encompassed within the term "substantially insoluble". Suitably, the functionalised polysaccharide compound has a solubility of less than 5% and desirably less than 1% in water at standard temperature and pressure. Solubility may suitably tested according to the procedure set out in Solubility of Polysaccharides and Their Behavior in Solution. *Advances in Chemistry*, Vol. 117 *Carbohydrates in Solution*, Chapter 14, pp 242-255 http://pubs.acs.org/doi/abs/10.1021/ba-1971-0117.ch014.

If the derivatised polysaccharide compound were to be soluble in the process stream, the compound would suitably bind to the intended target inorganic or organic compound in the process stream but remain in solution whereby the target compound would not be removed.

The sugar moieties which form the backbone of the insoluble polysaccharide compound are suitably β-D-glucose to provide cellulose or a glucose to provide starch or a combination of sugar moieties. Some or substantially all of the sugar moieties in the cellulose or starch may be derivatised.

We have found that compounds having a natural, organic backbone comprising cellulose or starch, especially cellulose, with a ligand L linked to the backbone through a sulphur atom provide an excellent combination of thermal and chemical stability and biodegradability. The presence of the sulphur-containing ligand affords a wide range of options for functionalisation such that the compound of the invention may be tailored according to the particular intended use of the compound and provides a desirable combination of characteristics to ameliorate problems associated with functionalised materials known in the art.

Preferably, the backbone of the insoluble polysaccharide compound comprises repeat units of formula:

where R is selected from OH and —NHCOCH$_3$. The backbone suitably comprises more than from 20 to 15000 sugar moieties, preferably 100 to 4000 sugar moieties especially 300 to 4000 sugar moieties, provided that the compound is substantially insoluble. Preferred examples of insoluble polysaccharide compounds include cellulose from wood pulp which typically has a backbone or chain length of 300 to 1700 sugar moieties and cellulose from cotton, other plant fibres or bacterial cellulose which typically have a backbone or chain length of 800 to 10000 sugar moieties.

The sugar moiety has a ring comprising 5 carbon atoms and an oxygen atom with a hydroxyl or NHCOCH$_3$ group at the 2 position, a hydroxyl group at the 3 position according to standard nomenclature and a hydroxyl substituent on the "6" carbon atom of the CH$_2$ group.

The sugar moiety may be derivatised at any one or more hydroxyl groups on the sugar moiety but is preferably derivatised at the "6" carbon whereby the "6" carbon is bound to the sulphur atom of ligand L. It is not necessary to derivatise every sugar moiety but preferably at least 10%, more preferably at least 50% and desirably at least 75% of the sugar moieties are derivatised with the thio-linked ligand L at one position, preferably the 6 position in each derivatised sugar moiety.

The compound of the invention may be produced in any suitable known form but is preferably in the form of beads, pellets, for example derived from microcrystalline cellulose, fibre, powder or paper, for example in the form of a membrane or filter.

In addition to sugar moieties derivatised by the ligand L, other sugar moieties which have not been derivatised by the ligand L may be derivatised by a different substituent L' at any one or more hydroxyl groups on the sugar moiety, preferably at the hydroxyl group on the "6" carbon. Suitably, substituent L' is selected from group X as defined herein, R$^1$, —Z, —(W(C R$^1$R$^2$)$_m$)$_n$Z and a divalent group which forms a cross-linking bridge between two or more sugar moieties.

Suitably, from 10 to 90%, preferably 10 to 50%, of the sugar moieties are derivatised with ligand group L, from 10 to 90%, preferably 50 to 90% of the sugar moieties are derivatised with ligand group L'. Optionally, some of the sugar moieties are not derivatised, preferably 0 to 80% and more preferably 0 to 20% of the sugar moieties are not derivatised. Suitably, substantially all of the sugar moieties are derivatised with groups L and L'.

Where the sugar moiety is derivatised by a divalent bridging or cross-linking ligand, the ligand will suitably also be bound to a second sugar moiety, thereby providing cross-linking between different parts of the same backbone or between different insoluble polysaccharide molecules.

The ligand (L) has a sulphur atom which is bound to the sugar moiety in the backbone of the insoluble polysaccharide, suitably at the 6-carbon position and is of formula —S(O)$_a$(CR$^1$R$^2$)$_n$X or —S(O)$_a$(CR$^1$R$^2$)$_n$S—Y as defined above in relation to compounds of the first invention.

R$^1$ and R$^2$ in each CR$^1$R$^2$ group may be the same or different and preferably are the same for each CR$^1$R$^2$ group. In an especially preferred embodiment, each CR$^1$R$^2$ group is CH$_2$.

In another embodiment, —S(O)$_a$(CR$^1$R$^2$)$_m$S(O)$_a$— is a linear group and each CR$^1$R$^2$ group is CH$_2$ and a is 0 in each occurrence. Examples of preferred ligands include —S(CH$_2$)$_{2-6}$S—, especially —S(CH$_2$)$_2$S—, —S(CH$_2$)$_3$S— and —S(CH$_2$)$_6$S—. The use of a divalent alkylene dithio ligand allows sugar moieties to be bonded together covalently to provide cross-linking to a desired degree. The functionalised polysaccharide compound may be porous and the pore size may be controlled by selection of the length and the degree of cross-linking of the dithio ligands.

Suitably, the invention provides a compound comprising an insoluble polysaccharide backbone selected from cellulose and starch, preferably cellulose, comprising more than 20 sugar moieties wherein at least one of the sugar moieties is derivatised at one or more of its hydroxyl groups with a ligand bound to the sugar moiety by a sulphur atom wherein the ligand is selected from:

—S(O)$_a$(C R$^1$ R$^2$)$_a$ C R$^1$ R$^2$R$^3$, for example —S(CH$_2$)$_n$—CR$^1$R$^2$R$^3$;

—S(O)$_a$(C R$^2$)$_n$ S(O)$_a$—Y, for example —S(CH$_2$)$_n$ SH;

—S(O)$_a$(C R$^1$ R$^2$)$_a$—(C=W)$_h$(W(C R$^1$ R$^2$)$_m$)$_n$Z, for example —S(CH$_2$)$_n$ C(O)(NR$^1$(CH$_2$)$_m$)$_a$ NR$^1$ R$^2$ and —S(CH$_2$)$_n$ (S(CH$_2$)$_m$)$_n$ SH and —S(O)$_a$(C R$^2$)$_n$ (CR$^1$Z)$_i$ Q$_h$C(=W)R$^1$, —S(O)$_a$(C R$^1$ R$^2$)$_a$ C R$^1$ R$^2$ (CR$^1$Z)$_i$Q$_h$CHR$^1$Z, —S(O)$_a$(C R$^1$ R$^2$)$_a$ C R$^1$ R$^2$ (CR$^1$Z)Q$_h$ [(CHR$^1$)$_n$W]$_t$ R$^1$ —S(O)$_a$(C R$^1$ R$^2$)$_a$ C R$^1$ R$^2$ (CR$^1$Z)$_i$Q$_h$ R$^3$; and —S(O)$_a$(C R$^1$ R$^2$)$_a$ OC(=W)R$^1$ wherein:

Q is independently selected from —C(=W$^1$)W$^2$—, —W$^2$ C(=W$^1$)—;

wherein W, W$^1$ and W$^2$ are independently selected from oxygen, sulfur, NR$^1$ Z is independently selected from —R$^1$, —OR$^1$, —NR$^1$R$^2$, and —SR$^1$; and R$^1$ and R$^2$ are independently selected from hydrogen, an optionally substituted linear or branched C$_{1-40}$-alkyl, C$_{2-40}$-alkenyl or C$_{2-40}$-alkynyl group, an optionally substituted aryl and an optionally substituted C$_{1-40}$-alkylaryl group;

R$^3$ is an optionally substituted, linear or branched C$_{1-40}$-alkyl, C$_{2-40}$-alkenyl or C$_{2-40}$-alkynyl group, an aryl and a C$_{1-40}$-alkylaryl group; and Y is selected from H and the options for X, excluding —S(O)$_a$—Y;

a is independently 0 to 2 h is independently 0 or 1;

i is independently an integer from 0 to 6;

m is independently an integer from 1 to 6;

n is independently an integer from 1 to 6, preferably 2 or 3; and t is independently an integer from 1 to 20, preferably 1 to 3.

The term "optionally substituted" as employed herein refers to the inclusion of a heteroatom for example oxygen, nitrogen, sulphur and halogen in the group to which optionally substituted applies. The heteroatom may be within a carbon chain in the group or be a substituent on a carbon chain or ring. Examples of optionally substituted aryl groups include phenyl substituted at ortho, meta or a para position with chlorine, bromine, OH, SH, NH2 or triflate The term "alkylaryl" as employed herein refers to a group which has a linear, branched or cyclic alkyl part and an aryl part and includes groups which include heteroatoms, for example nitrogen in the alkyl part, the aryl part or both the alkyl and aryl part. Examples of alkyl parts having a heteroatom include a morpholine group, piperidine, piperazine, pyrimidine, pyridine, a 5 or 6 membered ring including an oxygen atom in the ring and optionally an alkene bond. Examples of aryl parts having a heteroatom include pyridine and imidazoline. Where the term "alkylaryl" is employed herein, the immediately preceding carbon atom range refers to the alkyl substituent only and does not include any aryl carbon atoms. Examples of suitable alkaryl groups include benzyl, phenylethyl and pyridylmethyl.

The term "aryl" refers to a five or six membered cyclic, 8-10 membered bicyclic or 10-13 membered tricyclic group with aromatic character and includes systems which contain one or more heteroatoms, for example, N, O or S. Examples of suitable aryl groups include phenyl, phenyl substituted with chlorine, bromine or hydroxyl, pyridinyl and furanyl.

In preferred embodiments $R^1$ and $R^2$ are independently selected from hydrogen and linear or branched hydrocarbyl groups and/or may be substituted with one or more substituents but preferably contain only hydrogen and carbon atoms. In a further preferred embodiment, where $R^1$ and $R^2$ are hydrocarbyl groups, they are preferably independently linear and unsubstituted, that is they contain only hydrogen and carbon atoms. If a substituent is present, it may be selected from chloro, fluoro, bromo, nitrile, hydroxyl, sulfide, sulfoxide, sulfone, amino, amino $C_{1-40}$-alkyl or amino di ($C_{1-40}$-alkyl) or $C_{1-40}$-alkyl phosphinic or phosphonic group. In further preferred embodiments $R^1$ and $R^2$ are independently selected from hydrogen and linear or branched $C_{1-22}$ and desirably $C_{1-12}$-alkyl, $C_{2-22}$— and desirably $C_{2-12}$-alkenyl, aryl and a $C_{1-22}$-alkylaryl group and it is especially preferred that these groups are independently selected from hydrogen and a linear or branched $C_{1-8}$-alkyl, $C_{2-8}$-alkenyl, aryl and a $C_{1-8}$-alkylaryl group and especially independently hydrogen, a $C_{1-6}$-alkyl group, for example methyl or ethyl, or a phenyl group.

Examples of suitable alkyl groups include methyl, ethyl, isopropyl, n-propyl, butyl, tert-butyl, n-hexyl, n-decyl, n-dodecyl, cyclohexyl, octyl, iso-octyl, hexadecyl, octadecyl, iso-octadecyl and docosyl. Examples of suitable alkenyl groups include ethenyl, 2-propenyl, cyclohexenyl, octenyl, iso-octenyl, hexadecenyl, octadecenyl, iso-octadecenyl and docosenyl.

$C_{1-6}$-alkoxy refers to a straight or branched hydrocarbon chain having from one to six carbon atoms and attached to an oxygen atom. Examples include methoxy, ethoxy, propoxy, tert-butoxy and n-butoxy.

Where X is $—CR^1R^2R^3$ preferred examples of $—R^3$ include a $C_1$ to $C_8$ alkyl group optionally substituted with one or more amine or hydroxyl substituents, for example $—(CH_2)_{1-7}CH_2OH$, $—CH_2CH(OH)(CH_2)_{1-6}CH_2OH$, $—(CH_2)_{1-7}CH_2NH_2$.

Where X is $—(CR^1Z)_iQ_hC(=W)R^1$, $—CR^1R^2(CR^1Z)_iQ_hCHR^1Z$, $—C\ R^1R^2(CR^1Z)_iQ_h\ [(CHR^1)_nW]_t\ R^1$, or $—CR^1R^2\ (CR^1Z)_iQ_h\ R^3$, in preferred embodiments $—(CR^1Z)_i—$ is $—CHR^1—$ and $—(CR^1Z)_iQ_h—$ is $—CHR^1—C(O)NR^1—$ or $—CHR^1—NR^1C(O)—$. More preferably, in these cases, $R^1$ is hydrogen, methyl or ethyl and Z is SH, Q is NHC(O) or $—CO_2H$.

Where X is $—CR^1R^2\ [(CHR^1)_nW]_tR^1$ or $—CR^1R^2(CR^1Z)_iQ_h[(CHR^1)_nW]_tR^1$, X is preferably $—CH_2[(CH_2)_{1-4}NR^1]_{1-20}\ R^1$ and, in this case, and in a further preferred embodiment, $R^1$ is hydrogen, methyl or ethyl and t is from 1 to 10.

The loading of the ligand on the insoluble polysaccharide backbone may be tailored according to the desired loading for the particular application. A high loading of functional groups advantageously provides a high capacity for contaminant removal when employed to remove a contaminant for example cations or anions from a contaminated material.

Compounds according to the invention have a wide range of uses. The present invention provides a process for treating a feed material comprising contacting a compound according to the invention with a feed to remove or reduce the level of a component of the feed so as to produce a feed depleted in the removed component.

We have found that compounds of the invention provide surprisingly high levels of ion removal, particularly metal ions, from a feed or a body of liquid containing the ions.

The feed may be a continuous stream for example a continuous process reaction feedstock, or may be in the form of a batch of material for discrete treatment. The feed, for example a waste water or waste process stream, may be treated to selectively remove a component of the feed. The removed component may be an undesirable material in the feed and the process acts to provide a desired composition for the feed that has been depleted in the selectively removed component after contact with compounds of the invention.

This process may be used for example in removing unwanted species from a feed in a manufacturing or formulation process to improve the purity level of the manufactured or formulated product as regards the removed material, for example metal species. The invention is especially useful in recovery of metals from process streams, for example in mining effluent streams and basic streams in electronics manufacture, chemicals manufacture and refining processes. The compounds of the invention may also be employed in a pharmaceutical active manufacturing process in which metal ions may need to be reduced to very low levels to meet product safety requirements and is also especially useful in a process for producing electronic products where contamination by metal ions may be deleterious.

The invention provides in a further aspect a process for reducing the level of a contaminant in an aqueous or organic feed which contains the contaminant comprising contacting a compound according to the invention with the contaminated feed to bind the contaminant to the compound and separating the compound and bound contaminant from the contaminated feed thereby to provide a feed having no contaminant or a depleted level of contaminant.

The compounds of the present invention are especially suited to recover or remove a contaminant from a basic feed and provide advantage over silica-based materials due to their stability in basic conditions. The present compounds of the present invention are advantageous over polystyrene-based materials as they have higher wettability. Furthermore, the raw material from which the compound of the present invention is produced is a biopolymer and accordingly is biorenewable. Advantageously, consumption of material derived from oil or other fossil sources may be reduced or avoided.

The contaminant is suitably a metal species. Examples of metal species which the compounds may scavenge include palladium, platinum, rhodium, iridium, ruthenium, gold, nickel, copper, silver, mercury, iron, for example Fe(III), lead, chromium, cadmium, arsenic and cobalt. The contaminant may be anionic for example arsenates, chromates, permanganates, borates and perchlorates.

Suitably the contaminated material comprises a metal or complex thereof. Compounds of the invention suitably reduce the level of the metal or metal complex by at least 10%, preferably by at least 50% and more preferably by at least 90% based on the initial level of the metal or complex in the contaminated material.

Suitably the compound of the invention enables the level of the metal to be reduced to a level below 500 ppm, preferably below 100 ppm, especially below 50 ppm and desirably below 10 ppm.

The invention is particularly useful in removing or reducing the level of precious metals to very low levels in mining effluent streams and electronics manufacture or chemical synthesis process streams, especially streams having a basic pH.

The compounds of the invention have a number of free hydroxyl groups due to the polysaccharide backbone and are particularly suitable for removing ions from an aqueous material containing a contaminant. The contaminated material may be present in a mildly acidic or a basic stream for example having a pH from greater than 7 to 12.

The compounds of the invention are especially useful where the contaminated material is an industrial stream, for example an automotive manufacturing process, mining stream especially a mining effluent stream, for example containing precious or heavy metal species, a chemical synthesis process or waste stream containing precious metal or heavy metal species, an API synthesis process or waste stream and in a process stream in the production of electronic components. The compounds of the invention are especially suited to removal of a metal contaminant from a basic aqueous process stream, for example in the mining industry.

Compounds of the invention are suitably prepared by derivatising an OH group on the polysaccharide compound, preferably the OH group at the 6 carbon position to provide a thiol substituted polysaccharide compound.

The invention provides, in a further aspect, a method of producing a derivatised polysaccharide compound which is substantially insoluble in water comprising providing a polysaccharide compound having a backbone comprising more than 20 sugar moieties, derivatising at least one hydroxyl substituent, for example tosylating at least one hydroxyl substitutent and reacting the derivatised hydroxyl substituent with a ligand (L) of formula:

—S(O)$_a$(C R$^1$R$^2$)$_n$X such that the ligand is bound to the sugar moiety by the sulphur atom of the ligand
wherein:
independently in each occurrence, R$^1$ and R$^2$ are selected from hydrogen, an optionally substituted, linear or branched C$_{1-40}$-alkyl, C$_{2-40}$-alkenyl or C$_{2-40}$-alkynyl group, an aryl and a C$_{1-40}$-alkylaryl group;
a is independently in each occurrence from 0 to 2;
n is independently an integer from 1 to 22, preferably 1 to 12, especially from 1 to 6, for example 1, 2 or 3:

X is selected from:
—CR$^1$R$^2$R$^3$,
a divalent group, preferably —[CO$_2$(CH$_2$)$_m$CO$_2$]— or —[CH$_2$(CH$_2$)$_m$CH$_2$]-linking two sugar moieties and m independently being 1 to 10, preferably 1 to 6, for example 1, 2, or 4;
—CR$^1$R$^2$ (CR$^1$R$^2$)$_n$C(=W)R,
—CR$^1$R$^2$ (CR$^1$Z)$_i$ Q$_h$ CHR$^1$Z,
—CR$^1$ R$^2$(CR$^1$Z)$_i$ Q$_h$ [(CHR$^1$)$_n$W]$_t$R$^1$,
—(CR$^1$Z)$_i$ Q$_h$ C(=W)R$^1$
—CR$^1$ R$^2$(CR$^1$Z)$_i$ Q$_h$ R$^3$
—OC(=W)R;
wherein
R is independently selected from H, R$^1$, —OR$^1$, —NR$^1$R$^2$, —NHNR$^1$R$^2$ and —SR'; R$^3$ is an optionally substituted, linear or branched C$_{1-40}$-alkyl, C$_{2-40}$-alkenyl or C$_{2-40}$-alkynyl group, an aryl and a C$_{1-40}$-alkylaryl group;
Q is independently selected from —C(=W$^1$)W$^2$— and —W$^2$C(=W$^1$)—; W, W$^1$ and W$^2$ are independently selected from oxygen, sulfur, —N(R$^1$)— and —N(NR$^1$ R$^2$);
Z is independently selected from —OR$^1$, —NR$^1$R$^2$ and —SW;
h is independently 0 or 1;
i is independently from 0 to 6;
t is independently an integer from 1 to 20, preferably 1 to 3.
—[C(=W)]$_h$(W(C R$^1$R$^2$)$_m$)$_n$Z, and preferably in this case R$^1$ and R$^2$ are H and Z is OH or NH2; and
—S(O)$_a$—Y
wherein Y is a monovalent terminal group, preferably selected from H and the options for X, excluding —S(O)$_a$—Y.

In the process of the invention, the polysaccharide comprises at least 20 sugar moieties and is suitably selected from cellulose, starch, chitin and chitosan.

The invention also provides a method of producing a compound according to the invention comprising contacting a polysaccharide compound having a backbone comprising more than 20 sugar moieties with a thiol compound under conditions to react the thiol compound with a 6-hydroxyl group of the polysaccharide compound and contacting the thioether derivatised compound with a compound comprising a functional group X as defined herein under conditions to react the said compound comprising a functional group X with the derivatised polysaccharide compound to produce a compound according to the invention.

Any known method for carrying out the derivatisation may be employed. The polysaccharide compound may be tosylated using any known procedure, for example using a hydroxide solution or an amine. In one embodiment, derivatisation may be carried out by tosylation of the polysaccharide compound. Suitably the tosylation step is carried out by reacting tosyl chloride with the polysaccharide compound in the presence of an amine, for example triethylamine or N-methyl imidazole or a base for example sodium hydroxide. The tosylation may be carried out in an aqueous or organic solvent or as a melt. Examples of organic solvents include dimethyl sulphoxide (DMSO) dimethyl acetamide (DMAC) and dimethyl formamide (DMF) optionally with an ionic liquid. An example of a suitable synthetic method is shown in ACS Sustainable Chem. Eng 2017, 5, 5931-5939

We have found that higher levels of tosylation may be achieved by employing a procedure which is solvent-free, the base is N-methyl imidazole and using tosyl chloride and an excess of reagents of 3 to 10 equivalents for example 4 equivalents. Suitably, the polysaccharide compound has a tosylate loading of at least 0.1 mmol/gram, preferably at least 0.3 mmol/gram.

In another embodiment, the polysaccharide compound is suitably dissolved or dispersed in an aqueous base, for example sodium hydroxide at reduced temperature, for example 0° C. or below. The level of polysaccharide may typically be up to around 10% by weight of the solution. An immiscible phase, suitably comprising tosyl chloride and a hydrocarbon, for example toluene, is combined with the aqueous base phase, suitably at a reduced temperature, to produce a biphasic system. The polysaccharide is then reacted to produce a tosylated polysaccharide derivative and typically will be insoluble in aqueous solution. Advantageously, as compared to the "solvent-free" route described above, fewer stoichiometric equivalents of tosyl chloride are required and additional amine base is not required.

In a preferred embodiment, the polysaccharide is suitably combined with, for example suspended in, an aqueous solution comprising tetrabutylphosphonium hydroxide, for example at room temperature. The mixture is stirred until the polysaccharide dissolves or disperses. Advantageously, higher levels of concentration of the polysaccharide may be achieved than when using aqueous sodium hydroxide, suitably at least 10% by weight and preferably at least 14%.

Suitably, an immiscible phase comprising tosyl chloride and a hydrocarbon for example toluene is combined with the aqueous base phase to produce a biphasic system. The polysaccharide and tosyl chloride react to produce a tosylated polysaccharide derivative which is suitably insoluble in aqueous solution. The tosylated polysaccharide may be precipitated by any suitable method known to a skilled synthetic chemist, for example by the addition of methanol. This procedure is set out in Chem. Commun., 2012, 48, 1808-1810.

The tosylation process may be carried out in a mixer for solids or in an extruder.

Tosyl cellulose may suitably be prepared using the procedure set out in the paper by C. McCormick, Carbohydrate Research, 1990, 208, 189-191 in which cellulose tosylate is prepared from the reaction of cellulose dissolved in a dimethylacetamide-lithium chloride mix, with trimethylamine and tosyl chloride.

Tosyl cellulose may also be tosylated employing the procedure set out by Granstrom et al in Cellulose at doi: 10.1007/s10570-008-9197-5.

The tosyl substituent is then substituted using a thiol compound to derivatise the polysaccharide compound. Examples of suitable thiol compounds include ethane dithiol and propane dithiol. In one embodiment, the thiol compound is reacted with tosyl cellulose in the presence of i) diisopropylethyl amine (DI PEA) or triethyl amine and ii) dimethyl formamide (DMF) or dimethyl-acetamide (DMAc). Lithium chloride (LiCl) may optionally be present.

Suitably, the inorganic polysaccharide compound with the ligand (L) bound to the sugar moiety by a sulphur atom precipitates from the reaction mixture. The loading of the functionality per unit of the polysaccharide may be tailored according to the relative quantities of reactants in the tosylation step and in the substitution of the tosylate and the solvent employed. The degree of tosylation may affect the solubility of the tosyl for example a higher degree of tosylation, may provide a higher solubility of the tosylated product.

Figure 1:
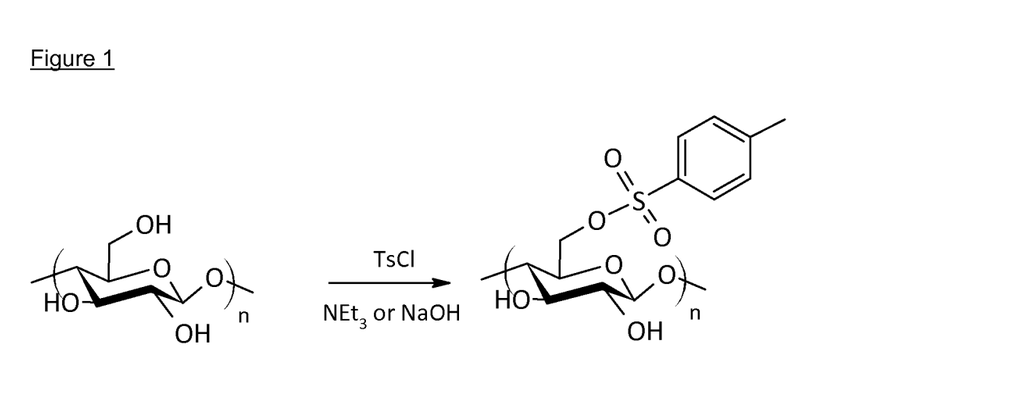
FIGS. 1 and 2 show a reaction scheme for the formation of tosyl cellulose and for the formation of a thiol derivative of cellulose which is suitable for further reaction to provide a functional group bound to the free thiol substituent.
Figure 2:
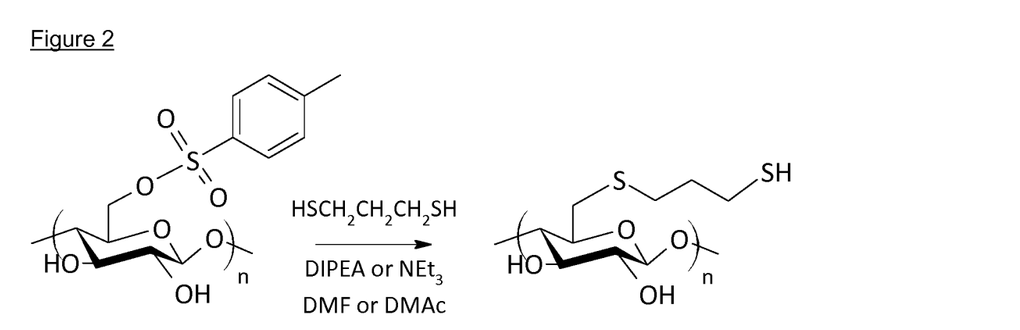

The functionalised polysaccharide compound may be in any suitable form. The functionalised polysaccharide compound is suitably cross-linked which may reduce swelling. Cross linking may be provided by dithiol bridges or by other known cross-linking moieties.

In a preferred embodiment, the compound of the invention is provided in the form of solid beads ranging from 0.01 to 10 mm but preferably 0.1 to 2 mm. Polysaccharide beads, for example cellulose beads, may be produced according to the procedure set out in Chemical Reviews at I Chem. Rev. 2013, 113, 4812-4836 or at J Phys Chem B2016, 120, 7906-7919.

Beads may also be produced by continuous manufacture via a membrane as set out by J C OBrien et al at http://pubs.acs.org/doi/abs/10.1021/acssuschemeng.7b00662 ACS Sustainable Chem. Eng. 2017, 5, 5931-5939

In another embodiment, the compound is in the form of nanofibres. Nanofibres may be anchored by thermal cross-linking in a scaffold, for example an electrospun polyacrylonitrile nanofibrous scaffold, to form nanofibrous composite membranes comprising the functionalised polysaccharide compound, for example as described in the paper by B. Chu, Polymer, 2014, 1167-1176.

The invention is now illustrated by the following non-limiting examples in which parts are by weight unless otherwise stated.

EXAMPLE 1

Synthesis of Cellulose Tosylate

Cellulose tosylate may be prepared by the following reaction procedure as set out in Green Chem., 2012, 14, 3126-3131. Suspend dried cellulose (1 g) in water (26.9 mL) then add NaOH (2.5 g) and stir/shake until dissolved. Freeze to a solid (salt/ice bath) then thaw to a gel at room temperature. Once thawed add more water (20.6 mL) then add $NEt_3$ and TsCl, then stir overnight at room temperature. Filter off the solid then wash with hot water (300 mL) then hot EtOH (150 mL). The tosylated cellulose is dried in a vacuum oven at 75-80° C., preferably overnight, before use to remove any residual water.

Synthesis of Cellulose Tosylate—Removal of $Et_3N$ and Addition of Toluene

An aqueous NaOH solution (2.3 M, 7.6 g) was added to microcrystalline cellulose (0.26 g) before freezing to a solid (−18° C. freezer, typically overnight). Thaw to room temperature then add toluene (6 mL) and tosyl chloride (1.2 g). Stir the mixture vigorously for 3 hours, before adding ethanol (30 mL). Filter off the solid material then wash with water (30 mL), ethanol (20 mL), toluene (20 mL), ethanol (20 mL), and water (20 mL). The resulting solid is dried overnight in a vacuum oven at 75° C. The degree of substitution (moles of tosyl per anhydroglucose unit) can be determined using ICP-OES analysis. Inclusion of toluene in the procedure allows lower amounts of tosyl chloride to be used compared to the above procedure, additionally under these conditions the triethylamine used in the above procedure was found to be unnecessary (neither beneficial nor detrimental) to the degree of substitution obtained.

Synthesis of Cellulose Tosylate—Removal of Complete Freezing Step

A solution of NaOH (40.1 g) in water (430 mL) is prepared and cooled to 0° C. To this solution add microcrystalline cellulose (30 g) and stir for 6 hours at 0° C. to disperse. The mixture is then left at 0° C. overnight without stirring before stirring is recommenced and toluene (360 mL) is added. Cool the mixture back to 0° C. before adding tosyl chloride (141 g) and stirring at 0° C. for 5 hours. Methanol (800 mL) is then added and the reaction mixture stirred for 30 minutes before filtering off the solid. The solid is washed with methanol (500 mL), water (500 mL), methanol (500 mL), water (500 mL), and methanol (500 mL). The resulting solid is dried overnight in a vacuum oven at 55° C.

Synthesis of Cellulose Tosylate in Dimethylacetamide and Lithium Chloride

Cellulose tosylate can also be prepared following non-aqueous reaction protocols, for example as described in Carbohydrate Research, 1990, 208, 183-191. To a stirred suspension of microcrystalline cellulose (1 g) and dimethylacetamide (50 mL) is added lithium chloride (4.2 g). This is then stirred overnight before triethylamine (30.1 mL) is added and the reaction cooled to 10° C. A solution of tosyl chloride (10.3 g) in dimethylacetamide is then dropped into the reaction and then left to stir at 10° C. for 24 hours. The solids were filtered off and then to the filtrate ice water is added to precipitate. The precipitated solid is filtered and washed with water before drying.

During the preparation the tosylated cellulose may be soluble in highly polar non-aqueous solvents for example DMSO, DMF or DMAC with or without added LiCl, depending on the degree of tosylation and in ionic liquids.

Synthesis of Cellulose Tosylate Using Tetrabutyl Phosphonium Hydroxide

Cellulose tosylate may also be prepared using tetrabutyl phosphonium hydroxide
to dissolve cellulose at room temperature to provide a solution having a high level of cellulose. Dried cellulose (0.5 g) was suspended in a tetrabutylphosphonium hydroxide solution (60% wt/wt aqueous, 3 g) and stirred until dissolved. The concentration of cellulose was 14% which is higher than typically achievable using sodium hydroxide solution and may be carried out at room temperature rather than at 0° C.

A solution of tosylchloride in toluene was added and stirred vigorously for 5 hours at room temperature. Methanol (30 mL) was added to precipitate solid material which was then filtered. The solid material was washed with methanol before drying the solid obtained overnight using a vacuum oven (65-70° C.).

EXAMPLE 2: SYNTHESIS OF CELLULOSE THIOL

Dissolve (or suspend) cellulose tosylate prepared in accordance with Example 1 or from another source in dry DMF under an atmosphere of argon, heating to ≥30° C. depending on the degree of tosylation. Add 10 equiv. of 1,3-propanedithiol and base (diisopropyltriethylamine or trimethylamine) and agitate by stirring or shaking at 80-100° C. for 24 h. Precipitate into ice cold water (150 mL), isolate by filtration (use filter with arm for vacuum, into single-necked RBF) then wash with acetone or MeOH and dry in a vacuum oven for at least 4 h at 65° C. The dithiol replaces the tosylate to produce a cellulose thiol with the —OH position at the 6 carbon being substituted by —S(CH$_2$)$_3$SH.

EXAMPLE 3: RECOVERY OF PALLADIUM FROM AN ORGANIC STREAM

The product of Example 2 was used to recover palladium from an organic process stream. The functional group loadings of the thiol substituent on the cellulose backbone were calculated (by ICP-OES). The compound according to the invention with 1 mole equivalent was then contacted with a 200 ppm model palladium solution (in DCM). The percentage recovery of Palladium was calculated from measurements on the treated stream and Pd loading on the scavengers (i.e. maximum metal loading on functionalised cellulose, g/kg) were measured from the solids (Table 1). The highest removal of palladium from a model stream was measured at 99%.

EXAMPLE 4: RECOVERY OF PALLADIUM FROM AN AQUEOUS STREAM

A 200 ppm Pd solution was prepared from a 10,000 ppm ICP standard. 10 ME of scavenger produced in Example 2 was tested to measure the average recovery of Pd from an aqueous stream. The results (Table 1) show very effective removal (99%). Cellulose and cellulose-tosylate were also tested and removed 0% Pd

EXAMPLE 5: RECOVERY OF GOLD FROM A BASIC AQUEOUS STREAM

An industrial aqueous waste stream containing 40 ppm Au (pH>12) was tested using scavenger produced in Example 2 to measure the average recovery of Au from an aqueous stream. Under conditions with 20 mole equivalents of scavenger at 80° C. for 22 hours the results show very effective removal (94%).

EXAMPLE 6: RECOVERY OF RUTHENIUM FROM A BASIC AQUEOUS STREAM

An industrial aqueous waste stream containing 29 ppm Ru was tested using scavenger produced in Example 2 to measure the average recovery of Ru from an aqueous stream. Under conditions with 20 mole equivalents of scavenger at either 25° C. or 80° C. for 22 hours the results show very effective removal (93-97%).

TABLE 1

| ME | Average recovery (%) | Pd Loading on cellulosic scavenger (g/kg) | Stream type |
| --- | --- | --- | --- |
| 1 | 40 | 32 | Org model Pd |
| 18 | 90 | — | Org model Pd |
| 10 | 99 | — | Aq model Pd |

The invention claimed is:

1. A compound comprising a substantially insoluble polysaccharide compound selected from cellulose and starch having a backbone comprising more than 20 sugar moieties wherein at least one of the sugar moieties is derivatised at one or more of its hydroxyl groups with a ligand (L) bound to the sugar moiety by a sulphur atom wherein the ligand L is of formula:

—S(O)a(C R$^1$R$^2$)nX wherein:
independently in each occurrence, R$^1$ and R$^2$ are selected from hydrogen, an optionally substituted, linear or branched C$_{1-40}$-alkyl, C$_{2-40}$-alkenyl or C$_{2-40}$-alkynyl group, an aryl and a C$_{1-40}$-alkylaryl group;

a is, independently in each occurrence from 0 to 2;
n is independently an integer from 1 to 22:
X is selected from:
  —$CR^1R^2R^3$;
  a divalent group linking two sugar moieties;
  —$CR^1R^2 (CR^1R^2)_nC(=W)R$;
  —$CR^1R^2 (CR^1Z)_i Q_hCHR^1Z$;
  —$CR^1R^2(CR^1Z)_i Q_h[(CHR^1)_nW]_tR^1$;
  —$(CR^1Z)_i Q_h C(=W)R^1$
  —$CR^1R^2(CR^1Z)_i Q_h R^3$
  —$OC(=W)R$;
  wherein
    R is independently selected from H, $R^1$, —$OR^1$, —$NR^1R^2$, —$NHNR^1R^2$ and —$SR^1$;
    $R^3$ is an optionally substituted, linear or branched $C_{1-40}$-alkyl, $C_{2-40}$-alkenyl or
    $C_{2-40}$-alkynyl group, an aryl and a $C_{1-40}$-alkylaryl group;
    Q is independently selected from —$C(=W^1)W^2$— and —$W^2C(=VV^1)$—;
    W, $W^1$ and $W^2$ are independently selected from oxygen, sulfur, —$N(R^1)$— and —$N(NR^1 R^2)$;
    Z is independently selected from —$OR^1$, —$NR^1R^2$ and —$SR^1$;
    h is independently 0 or 1;
    i is independently from 0 to 6;
    t is independently an integer from 1 to 20; and
  $[C(=W)]_h(W(C R^1R^2)_m)_nZ$.

2. A compound according to claim 1 has a solubility of less than 5% and desirably less than 1% in water at standard temperature and pressure.

3. A compound according to claim 1 wherein the polysaccharide comprises cellulose.

4. A compound according to claim 1 wherein the sugar moieties are derivatised at the hydroxyl substituent on the "6" carbon atom of the sugar moiety.

5. A compound according to claim 1 wherein a first proportion of the sugar moieties are derivatised by the ligand L and a second proportion of the sugar moieties are derivatised by a different substituent L' at any one or more hydroxyl groups on the sugar moiety wherein L' is selected from group X, $R^1$, —Z, —$(W(C R^1R^2)_m)_nZ$ and a divalent group which forms a cross-linking bridge between two or more sugar moieties.

6. A compound according to claim 1 wherein $R^1$ and $R^2$ are independently selected from hydrogen, a linear or branched $C_{1-40}$-alkyl, $C_{2-40}$-alkenyl or $C_{2-40}$-alkynyl group, an aryl and a $C_{1-40}$-alkylaryl group, m is from 1 to 20, a is from 0 to 2 and b is from 0 to 2.

7. A compound according to claim 1 at least a proportion of the groups X are a divalent group selected from —$[CO_2(CH_2)_mCO_2]$— and —$[CH_2(CH_2)mCH_2]$— linking two sugar moieties and m is independently from 1 to 10.

8. A compound according to claim 1 wherein the functional group X is selected from:
  —$S(O)_a(C R^1 R^2)_n C R^1 R^2R^3$;
  —$S(O)_a(C R^1 R^2)_n$—$(=W)_h(W(C R^1 R^2)_m)_nZ$;
  —$S(O)_a(C R^1 R^2)_n(CR^1Z)_iQ_hC(=W)R^1$;
  —$S(O)a(C R^1 R^2)_n C R^1 R^2 (CR^1Z)_iQ_hCHR^1Z$;
  —$S(O)_a(C R^1 R^2)_n C R^1 R^2 (CR^1Z)Q_h[(CHR^1)_nW]_tR^1$
  —$S(O)_a(C R^1 R^2)_n C R^1 R^2 (CR^1Z)_iQh R^3$; and
  —$S(O)_a(C R^1 R^2)_n OC(=W)R^1$ wherein:
  Q is independently selected from —$C(=W^1)W^2$—, —$W^2 C(=W^1)$—;
  W, $W^1$ and $W^2$ are independently selected from oxygen, sulfur, $NR^1$;
  Z is independently selected from —$R^1$, —$OR^1$, —$NR^1R^2$ and —$SR^1$; and
  $R^1$ and $R^2$ are independently selected from hydrogen, a linear or branched $C_{1-22}$-alkyl, $C_{2-22}$-alkenyl and $C_{2-22}$-alkynyl group, an optionally substituted aryl and an optionally substituted $C_{1-22}$-alkylaryl group;
  $R^3$ is an optionally substituted, linear or branched $C_{1-22}$-alkyl, $C_{2-22}$-alkenyl or $C_{2-22}$-alkynyl group, an aryl and a $C_{1-22}$-alkylaryl group
  a is independently 0 to 2
  h is independently 0 or 1;
  i is independently from 0 to 6;
  m is independently from 1 to 6;
  n is independently from 1 to 6;
  t is independently from 1 to 20.

9. A compound according to claim 1 wherein X is selected from —$S(CH_2)_n$—$CR^1R^2R^3$; —$S(CH_2)_nC(O)(NR^1 (CH_2)_m)_nNR^1 R^2$ and —$S(CH_2)_n (S(CH_2)_m)_n SH$.

10. A compound according to claim 1 wherein X is selected from —$S(CH_2)_nSH$; —$S(CH_2)_nC(O)(NR^1 (CH_2)_m)_nNR^1 R^2$ and —$S(CH_2)_n(S(CH_2)_m)_nSH$.

11. A compound according to claim 10 wherein n is independently in each occurrence, 2 or 3.

12. A process for treating a feed comprising contacting a compound claim 1 with a feed:
  i) to effect a chemical reaction by catalytic transformation of a component of the feed to produce a desired product; or
  ii) to remove or reduce the level of a component of the feed so as to produce a feed depleted in the removed component.

13. A process according to claim 12 wherein the component is selected from palladium, platinum, rhodium, iridium, ruthenium, gold, nickel, copper, silver, mercury, iron, lead, chromium, cadmium, arsenic, cobalt, arsenates, chromates, permanganates, borates and perchlorates.

14. A process according to claim 12 wherein the level of the component in the feed depleted in the removed component is at least 10% less than the level of the component in the feed by weight based on the level of the component in the feed.

15. A process according to claim 12 wherein the component is a metal species and it is reduced to a level below 500 ppm in the feed depleted in the component.

16. A process according to claim 12 wherein the feed is an aqueous stream, an industrial process stream, a mining process stream, a chemical synthesis process stream or a process stream in the production of electronic components wherein the compound reduces the level of metal species in the stream.

17. A method of producing a derivatised polysaccharide compound which is substantially insoluble in water comprising providing a polysaccharide compound selected from cellulose and starch having a backbone comprising more than 20 sugar moieties, derivatising at least one hydroxyl substituent and reacting the derivatised hydroxyl substituent with a compound to provide a ligand (L) of formula:

—$S(O)_a(C R^1R^2)_nX$ such that the ligand is bound to the sugar moiety by the sulphur atom of the ligand wherein:

independently in each occurrence, $R^1$ and $R^2$ are selected from hydrogen, an optionally substituted, linear or branched $C_{1-40}$-alkyl, $C_{2-40}$-alkenyl or $C_{2-40}$-alkynyl group, an aryl and a $C_{1-40}$-alkylaryl group;

a is, independently in each occurrence from 0 to 2;

n is independently an integer from 1 to 22, preferably 1 to 12, especially from 1 to 6, for example 1, 2 or 3:

X is selected from:

—$CR^1R^2R^3$, a divalent group, preferably —$[CO_2(CH_2)_mCO_2]$— or —$[CH_2(CH_2)_mCH_2]$— linking two sugar moieties and m independently being 1 to 10, preferably 1 to 6, for example 1, 2, or 4;

—$CR^1R^2 (CR^1R^2)_nC(=W)R$,

—$CR^1R^2 (CR^1Z)_i Q_h CHR^1Z$;

—$CR^1R^2(CR^1Z)_i Q_h[(CHR^1)_n W]_t R^1$;

—$(CR^1Z)_i Q_h C(=W)R^1$

—$CR^1R^2(CR^1Z)_i Q_h R^3$ $OC(=W)R$;

wherein

R is independently selected from H, $R^1$, —$OR^1$, —$NR^1R^2$, —$NHNR^1R^2$ and —$SR^1$;

$R^3$ is an optionally substituted, linear or branched $C_{1-40}$-alkyl, $C_{2-40}$-alkenyl or $C_{2-40}$-alkynyl group, an aryl and a $C_{1-40}$-alkylaryl group;

Q is independently selected from —$C(=W^1)W^2$— and —$W^2 C(=W)$—;

W, $W^1$ and $W^2$ are independently selected from oxygen, sulfur, —$N(R^1)$—and —$N(NR^1 R^2)$;

Z is independently selected from —$OR^1$, —$NR^1R^2$ and —$SR^1$;

h is independently 0 or 1;

i is independently from 0 to 6;

t is independently an integer from 1 to 20, preferably 1 to 3 and;

—$[C(=W)]_h(W(C R^1R^2)_m)_nZ$, and preferably in this case $R^1$ and $R^2$ are H and Z is OH or $NH_2$.

18. A method according to claim 17 compound is cellulose.

19. A method according to claim 17 wherein the polysaccharide compound is contacted with tetrabutyl phosphonium hydroxide solution to produce a an aqueous solution or dispersion comprising at least 10% by weight of dissolved polysaccharide which is then subjected to the said derivatisation step.

20. A scavenging product comprising a compound as defined in claim 1 in the form of a bead, microcrystalline material, nanofibers or a membrane.

21. A compound comprising a polysaccharide compound which is substantially insoluble in water at standard temperature and pressure selected from cellulose and starch having a backbone comprising more than 20 sugar moieties wherein at least one of the sugar moieties is derivatised at one or more of its hydroxyl groups with a ligand (L) bound to the sugar moiety by a sulphur atom wherein the ligand L is of formula —$S(O)_a(C R^1 R^2)_n X$ wherein:

independently in each occurrence, $R^1$ and $^2$ are selected from hydrogen, an optionally substituted, linear or branched $C_{1-40}$-alkyl, $C_{2-40}$-alkenyl or $C_{2-40}$-alkynyl group, an aryl and a $C_{1-40}$-alkylaryl group;

a is, independently in each occurrence, from 0 to 2;

n is 3 to 6; and

X is —$S(O)_a$—Y wherein Y is a monovalent terminal group.

* * * * *